United States Patent [19]
Alden et al.

[11] Patent Number: 5,715,735
[45] Date of Patent: Feb. 10, 1998

[54] WORKPIECE EJECTOR

[75] Inventors: Richard M. Alden, Montgomery; Charles D. Allison, Dayton, both of Ohio

[73] Assignee: First Tool Corporation, Dayton, Ohio

[21] Appl. No.: 589,154

[22] Filed: Jan. 22, 1996

[51] Int. Cl.$^6$ ................................................. B23B 15/00
[52] U.S. Cl. .................. 82/124; 82/152; 279/156; 408/68
[58] Field of Search ........................ 27/124, 142, 152; 409/233; 279/156; 408/68

[56] References Cited

U.S. PATENT DOCUMENTS

| | | | |
|---|---|---|---|
| 1,446,305 | 2/1923 | Howe . | |
| 1,964,937 | 7/1934 | Dumser et al. | 82/2 |
| 2,109,600 | 3/1938 | Vanderbeek | 51/134 |
| 3,025,646 | 3/1962 | Thompson | 51/165 |
| 3,118,345 | 1/1964 | Bullard, III et al. | 409/233 |
| 3,174,165 | 3/1965 | Atherholt | 279/4 |
| 3,927,583 | 12/1975 | Parsons et al. | 82/124 |
| 4,604,009 | 8/1986 | Tennerstedt | 409/233 |

FOREIGN PATENT DOCUMENTS

| | | | |
|---|---|---|---|
| 1245250 | 7/1967 | Germany | 409/233 |

OTHER PUBLICATIONS

Unnumbered drawing showing part ejector sold by R & D Tool & Die Inc., Itaska, Illinois 60143 more than one year prior to Jan. 22, 1996.

See accompanying Information Disclosure Statement regarding sale of machine including ejector in accordance with this invention.

*Primary Examiner*—Steven C. Bishop
*Attorney, Agent, or Firm*—Roger S. Dybvig

[57] ABSTRACT

A workpiece ejector has an air actuator mounted within a lathe spindle for rotation therewith. The ejector actuator is controlled to extend its piston and piston rod to eject a workpiece from the lathe collet. A removable ejector nosepiece may be connected to the piston rod for movement into engagement with a workpiece held in the collet mechanism. Air under pressure is supplied to the air actuator at a first pressure to continuously press the nosepiece against the workpiece to seal the spindle assembly from contaminants, and at a second pressure to eject the workpiece. Controls are provide to sense whether a workpiece was properly ejected and to interrupt lathe operations if a workpiece was not properly ejected.

22 Claims, 2 Drawing Sheets

WORKPIECE EJECTOR

FIELD OF THE INVENTION

This invention relates to a workpiece ejector for a lathe.

BACKGROUND OF THE INVENTION

Conventional hollow-spindle lathes typically include a motor driven rotating spindle which has a collet mechanism connected to one end thereof for gripping material to be machined. In initial workpiece machining, which may be termed primary machining operations, workpieces are machined from raw bar stock that extends from within the spindle and is gripped by the collet mechanism. After the primary machining is completed, the machined workpiece is cut from the bar stock. Thereafter, the collet mechanism is opened and additional bar stock is drawn from the spindle so that new stock extends from the collet mechanism for machining. This cycle is repeated to form several machined workpieces from the bar stock supplied through the draw tube.

In many instances, secondary machining operations must be performed on workpieces that have previously been machined using the primary machining operation described above. These secondary operations are required, for example, when a different tool is needed to perform additional machining. In such cases, the previously-machined workpieces are individually placed in the collet mechanism and rotated for further machining. Because the previously machined workpieces are not formed from raw bar stock, but rather are already partially machined, no bar stock is drawn through spindle. In these secondary machining operations, the machined workpiece is held by the collet mechanism, as opposed to the primary operations where only the non-machined bar stock is held. The machined workpiece must be ejected from the collet mechanism after the secondary operations are completed.

Workpiece ejectors have been considered for use in otherwise conventional lathes used in secondary operations. A workpiece ejector that has been suggested would include an elongated ejector push rod that extends through the draw tube of an otherwise conventional lathe. The ejector push rod would be attached to an external plate that is driven by fixed, external air actuators to move the push rod into engagement with a workpiece to eject the workpiece from the collet mechanism. By relying on fixed external actuators, the space required for installation of a lathe including such suggested ejector is substantially increased. In addition, such suggested ejector is considered costly and complex.

SUMMARY OF THE INVENTION

An object of this invention is to provide a workpiece ejector for a lathe wherein the ejector actuator is located within the rotating spindle of the lathe.

Another object of this invention is to provide a durable, easy to operate, low cost workpiece ejector for use with a lathe.

Still another object of this invention is to provide a workpiece ejector that minimizes the space required for installation of a lathe equipped with the ejector.

Yet another object is to provide a workpiece ejector that may be used with an otherwise conventional lathe without substantial modification to the lathe or the lathe controls.

In accordance with this invention, a workpiece ejector comprises an ejector actuator, preferably an air cylinder, located within the lathe spindle and mounted for rotation therewith. The ejector actuator drives a readily replaceable ejector nosepiece that is movable to engage a workpiece held by the collet mechanism. An air supply conduit or pipe, which extends within the spindle and also rotates therewith, connects the ejector actuator to a source of air under pressure through a rotating union.

A failure to properly eject a workpiece must interrupt operation of the lathe. Therefore, when the ejector is actuated, a cycle is started that requires a piston within the ejector actuator air cylinder to reach its fully extended position within a short time period. A sensing switch, preferably a magnetic reed switch, is located adjacent the ejector actuator and is closed by the piston, which is preferably magnetic, when fully extended. The sensing switch thus senses whether the workpiece was properly ejected from the collet mechanism. If the piston is not fully extended, the sensing switch is not closed and operation of the lathe interrupted. The sensing switch is preferably connected to a lathe controller by way of a slip ring assembly attached to and rotating with the spindle, a connecting cable extending within the spindle from the sensing switch to the slip ring assembly, and a fixed brush assembly, which is in electrical contact with the slip ring assembly.

A pressure regulating mechanism is provided intermediate the air source and the air supply conduit to control operation of the ejector actuator. The regulator mechanism includes a first air pressure regulator which supplies air to the ejector actuator at a first pressure at all times except when a workpiece is being ejected. The first pressure is a sealing pressure which maintains the nosepiece in contact with the workpiece to seal the spindle from lubricants, coolants, and other contaminants. A second air pressure regulator supplies air to the ejector actuator at a second, typically higher pressure to extend the ejector actuator piston and eject a workpiece from the collet mechanism.

Other objects and advantages of this invention will become apparent in view of the following description and the accompanying drawings.

DETAILED DESCRIPTION

Figure 1:
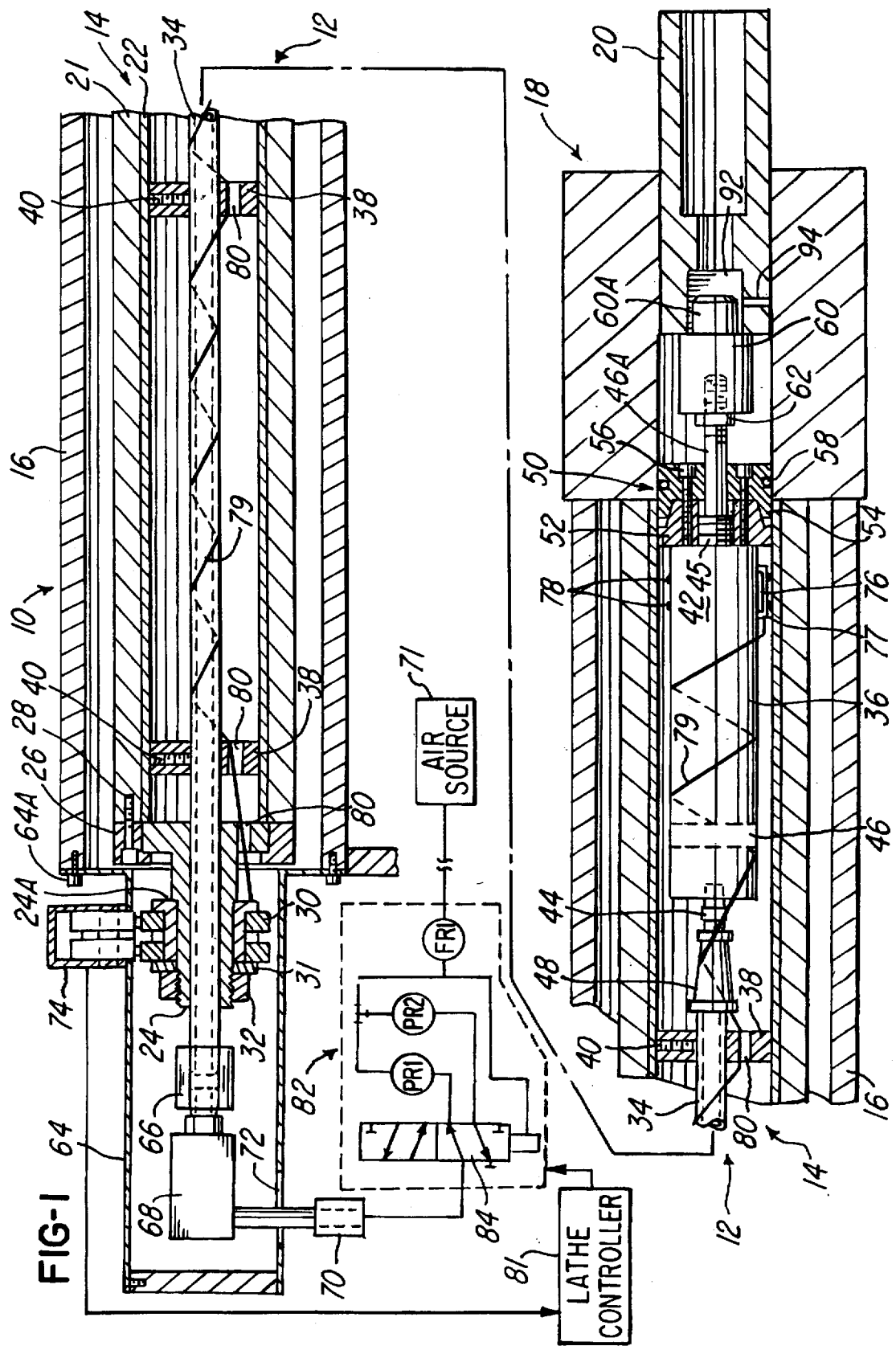
FIG. 1 is an axial cross-sectional view of a representative rotary lathe modified to include a workpiece ejector in accordance with this invention, and includes a diagrammatic representation of a pneumatic controller used with the ejector.

With reference to FIG. 1, the relevant portions of a representative, commercially-available lathe, generally designated 10, are shown in simplified form and modified in accordance with this invention to include a workpiece ejector, generally designated 12. The illustrated lathe 10 is a Miyano LE-22 CNC lathe manufactured by Miyano Machinery USA Inc., Wood Dale, Ill. 60191, and comprises a rotatable spindle assembly, generally designated 14, that is rotatably driven in a well known manner by suitable drive means (not shown). The lathe 10 also includes a fixed outer shield 16 that protects the lathe operator from the spindle assembly 14. A releasable collet mechanism, generally designated 18, is attached to the forward end of the spindle assembly 14 and releasably grips a workpiece 20 on which machining operations are to be performed. The collet mechanism 18, which is shown in highly simplified form in FIG. 1, may be conventional and the details thereof form no part of this invention. The spindle assembly 14 includes an axially-fixed, hollow outer spindle 21 and an axially-movable inner draw tube 22. The draw tube 22 is moved axially by conventional means, for example a solenoid (FIG. 2) which activates a hydraulic valve to apply hydraulic pressure to the draw tube 22, to open and close the collet mechanism 18.

In accordance with this invention, the ejector 12 comprises an ejector actuator 36, preferably an air actuator, mounted within the draw tube 22, as will be described below, and controlled by a pneumatic controller 82. A sensing switch 76 is provided adjacent the ejector actuator 36 and senses whether a workpiece 20 is properly ejected from the collet mechanism 18, as will be described below.

With further reference to FIG. 1, an axially-extending, slip ring holder 24, preferably formed from aluminum, is secured to the rear end of the spindle assembly 14 by a cap 26, which is connected to the outer spindle 21 by screws 28, only one of which is shown. For reasons which will become apparent, a commercially-available, electrically-conductive slip ring assembly 30, such as available from Kirkwood Commutator Co. (a division of Kirkwood Industries, Inc.), Cleveland, Ohio 44135, is slidably and concentrically received over a cylindrical nose portion of the slip ring holder 24 and abuts against a rearwardly-facing shoulder 24A formed thereon. An insulator 31, preferably formed from a polytetraflouroethylene polymer (Teflon), is also placed over the nose portion adjacent the slip ring assembly 30, and a nut 32 is then threadedly attached to the slip ring holder 24 to secure the slip ring assembly 30 against the shoulder 24A.

An air supply conduit or pipe 34 extends centrally through the slip ring holder 24 and the draw tube 22 to the ejector actuator 36 mounted in the draw tube 22 for rotation therewith. Plural, washer-like pipe supports 38 are slidably received around the pipe 34 to support the pipe 34 within the draw tube 22. Preferably, the supports 38 are formed from Teflon and are secured to the pipe 34 by set screws 40 before assembling the pipe 34 into the draw tube 22. The pipe supports 38 are so sized that they frictionally engage the interior wall of the draw tube 22 and provide a snug fit thereto so that the air supply pipe 34 rotates with the draw tube 22 and also moves axially therewith.

The ejector actuator 36 may be conventional and comprises a cylinder 42 having an air inlet 44 and a threaded forward section 45, an axially-movable internal magnetic piston 46, and a piston rod 46A drivingly connected to the piston. Preferably, the ejector actuator 36 is a single-acting air actuator including a spring return (not shown), such as is available from American Cylinder Co., Inc., Peotone, Ill. 60468. Pressurized air is supplied to the cylinder 42 through the pipe 34, which is connected to the air inlet 44 by a coupling 48. The ejector actuator 36 is fixed within the draw tube 22 by a mounting assembly, generally designated 50, so that the ejector actuator 36 moves, both axially and rotationally, with the draw tube 22.

The ejector actuator mounting assembly 50 comprises a nose 52 having a generally conical forward end that is threaded onto the forward section 45 of the cylinder 42. An expandable clamp 54, preferably formed from steel, is secured to the nose 52 by a pair of screws 56. The clamp 54 has a rearwardly opening conical recess that mates with the conical forward end of the nose 52. The clamp 54 has splits formed therein so that, as the screws 56 are advanced into bores in the nose 52, the clamp 54 expands to lock the ejector actuator 36 in position within the draw tube 22. To seal the draw tube 22 from lubricants, shavings and other contaminants, a rubber O-ring 58 is provided in an annular channel in the clamp 54.

The piston rod 46A of the ejector actuator has an externally-threaded forward end, and an ejector nosepiece 60 having an internally threaded bore in its rearward end may be threadedly and removably attached to the forward end of the piston rod 46A. The nosepiece 60, which may be formed from any suitable heat-treated alloy, is advanced rearwardly against a jam nut 62 provided near the forward end of the piston rod 46A to lock the ejector nosepiece 60 in place. So that the ejector 12 may be used with various different workpieces, the ejector nosepiece 60, which engages the workpiece 20, may be readily removed and replaced when the nosepiece 60 is extended past the collet mechanism 18, as will be described below.

With continued reference to FIG. 1, the slip ring holder 24 and the slip ring assembly 30 mounted thereon may be located within a fixed cover 64 that is secured to the outer shield 16 by screws 64A. The air supply pipe 34 also extends rearwardly within the cover 64. The pipe 34 is connected by a connector 66 to a commercially-available rotary union 68, which is also located within the cover 64. As will be evident to one of ordinary skill in the art, the rotary union 68 permits air under pressure to be transferred from a fixed air source to a rotating part, namely the supply pipe 34. The presently preferred rotary union 68 is available from Deublin Company, Waukegan, Ill. 60085-6747. The exact specifications of the rotary union 68 will depend upon the particular application.

The rotary union 68 is provided with an air inlet 70 that extends through an elongate slot 72 in the cover 64 and is connected to a source of air under pressure, shown diagrammatically at 71. Because the air supply pipe 34 is frictionally retained within the draw tube 22, the pipe 34 and the rotary union 68 move axially with the draw tube 22 when the collet mechanism 18 is actuated. As is evident, the air inlet 70 of the union 68 then moves axially within the slot 72. In this respect, the slip ring holder 24 and the slip ring assembly 30 are secured to the outer spindle 21, which does not move axially with the draw tube 22. Therefore, the slip ring assembly 30 is at all times aligned and in electrical contact with a commercially-available brush assembly, generally designated 74, such as available from the aforementioned Kirkwood Commutator Co., the purpose of which will be described below.

As mentioned above, the ejector actuator 36 preferably includes a magnetic piston 46, which is well known in the art and may either be entirely magnetic or include magnetic inserts (not shown). So that the axial position of the Piston 46 and the piston rod 46A may be determined, a sensing switch 76, preferably a commercially-available reed switch, is suitably secured to the outside of the cylinder 42, such as by a switch retainer 77 and wire ties 78. The magnetic piston 46 closes the sensing switch 76 when the piston 46 is aligned therewith. For reasons which will be described below, signals from a lathe controller 81 are transmitted through the sensing switch 76, if it is closed, by the fixed brush assembly 74 and the rotating slip ring assembly 30, which is electrically connected to the sensing switch 76 by a connecting cable 79. The lathe controller 81 may be any suitable (either fixed or programmable), commercially-available controller, such as the controller accompanying the aforementioned Miyano LE-22 CNC lathe.

With further reference to FIG. 1, the air pressure supplied to the ejector actuator 36 is governed by a pneumatic controller, shown diagrammatically at 82, which is disposed between the air inlet 70 and the source of air under pressure 71. The pneumatic controller 82 is responsive to signals from the lathe controller 81, as will be described below, and comprises a control valve 84, a first air pressure regulator PR1 providing a "sealing" pressure, a second air pressure regulator PR2 providing an "eject" pressure, and an optional filter air pressure regulator FR1. The purposes of the "sealing" pressure and the "eject" pressure will be described in detail below.

In the presently preferred embodiment, the valve 84 is such that it requires a predetermined, minimum pilot pressure to operate. Air supplied to the pneumatic controller 82, which is regulated by the optional filter regulator FR1, must be at a system pressure at least as high as the required minimum pilot pressure. Typically, the regulated pressures supplied by the air pressure regulators PR1 and PR2 are such that the "eject" pressure is higher than the "sealing" pressure. In a constructed embodiment, an overall system pressure in the range of 70–80 psi was used to meet valve pilot pressure requirements of at least 50 psi. The first air pressure regulator PR1 was set to a "sealing" pressure of 10–15 psi, and the second air pressure regulator PR2 was set to an "eject" pressure of 30–40 psi. However, depending on the workpiece configuration and weight, among other factors, these pressures may vary considerably and may, in fact, be reversed, with the "seal" pressure being higher than the "eject" pressure.

In operation of the ejector 12 the collet mechanism 18 is first opened without a workpiece therein by movement of the draw tube 22. Thereafter, air is supplied to the ejector actuator 36 the second air pressure regulator PR2 so that the piston 46 and the piston rod 46A of the ejector actuator 36 are fully extended to extend the ejector nosepiece 60 past the collet mechanism 18. (At this time, the ejector nosepiece 60 may be cleaned or may be removed by the lathe operator and replaced with an appropriately sized ejector nosepiece 60, if necessary). After the piston 46 and the piston rod 46A are extended, pressure supplied to the ejector actuator 36 reverts to and is maintained at the "sealing" pressure, which is sufficient to overcome the return force of the actuator spring return. A suitable loading mechanism (not shown), the details of which form no part of this invention, then aligns a workpiece 20 with the collet mechanism 18 and the ejector nosepiece 60. The workpiece 20 is then advanced into the collet mechanism 18 with sufficient force to overcome the "sealing" pressure, thereby causing the ejector nosepiece 60 and the ejector actuator piston 46 to be pushed rearwardly, i.e. to the left as viewed in FIG. 1. After the workpiece 20 is located within the collet mechanism 18, the draw tube 22 is retracted so that the collet mechanism 18 grips the workpiece 20.

At this time, the desired machining may be performed on the workpiece 20. At all times except during an ejection cycle, which will be described below, the air pressure to the ejector actuator 36 is maintained at the "sealing" pressure to keep the ejector nosepiece 60 in contact with the workpiece 20. The illustrated workpiece 20 has a hole 92 therein that extends the entire length of the workpiece. The hole 92 has a transversely extending conduit 94 through which coolants, lubricants, and other contaminants might pass into the spindle assembly 14. To prevent such contamination, the ejector nosepiece 60 is maintained in constant contact with the workpiece 20 by the constant application of the "sealing" pressure, as described above. Although the ejector nosepiece 60 may simply have a flat, forwardly facing surface, a projection 60A is preferably provided on the forward end of the ejector nosepiece 60. The projection 60A is received in the hole 92 to close the conduit 94 and to help seal the spindle assembly 14 from lubricants and other contaminants, such as metal chips, that might otherwise pass into the spindle assembly 14. Because the workpieces 20 and the holes 92 therein may vary in dimension from workpiece to workpiece, the ejector nosepiece 60 is readily replaceable, as explained above.

Figure 2:
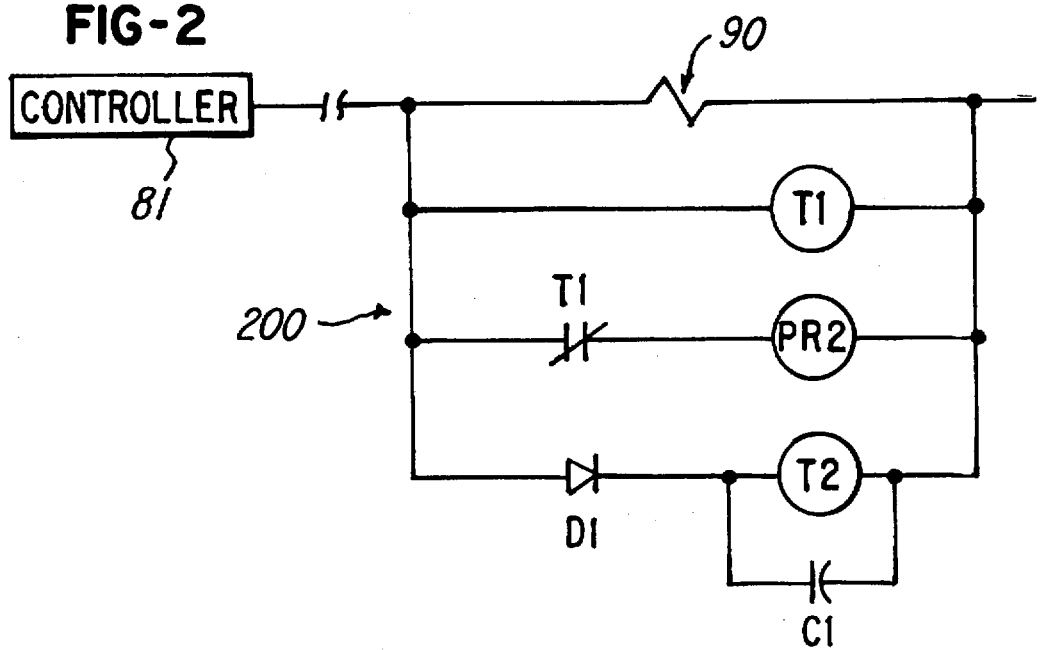
FIGS. 2 and 3 are schematic diagrams of portions of an electrical control circuit used to operate and control the ejector and, in particular, to interrupt operation of the lathe if a workpiece fails to properly eject from the lathe.
Figure 3:
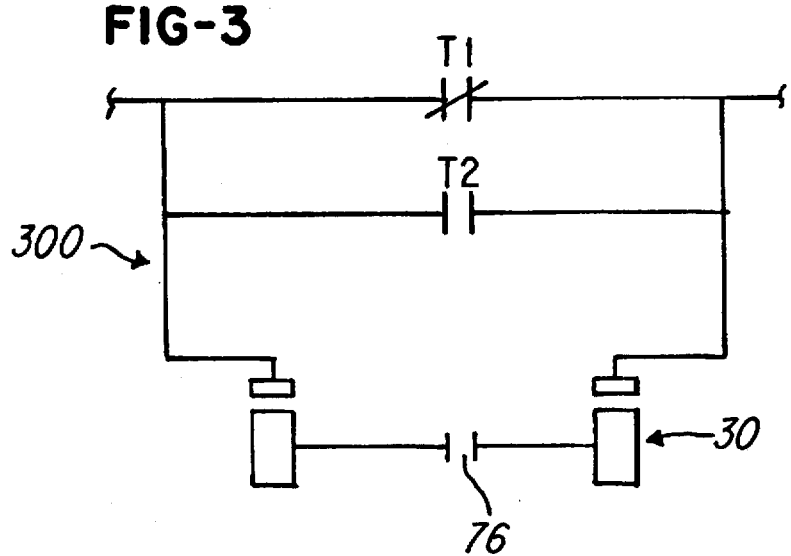

Following the machining operations, the lathe controller 81 issues a "collet open" signal to open the collet mechanism 18. (The workpiece 20 may still be lightly gripped by the collet mechanism 18 after the collet mechanism is opened.) With reference to FIG. 2, the "collet open" signal is applied not only to a collet open solenoid 90, but also to an ejector control circuit 200, which includes a first timed switch T1 and a second timed switch T2. The contacts of the switch T1 are in series with the coil of the valve 84. Power through the T1 contacts causes the valve 84 to supply air to the ejector actuator 36 at the "eject" pressure from the second air pressure regulator PR2. With reference to FIG. 3, the contacts of the switch T1, the switch T2, and the sensing switch 76 are connected in parallel and form an interrupt circuit 300, which will be described below in further detail.

Typically, the controller signals are digital signals which are either a logical 0 at or near ground and a logical 1 at +24 volts. The "collet open" signal is at +24 volts. This signal not only causes the collet mechanism 18 to be opened, but also powers and activates the timed switches T1 and T2. The switches T1 and T2 are each preferably an E-type switch, which remains in its normal state until the timer coil therein times out and which does not return to its normal state until power to it is discontinued. As evident from the drawings, the switch T1 has normally closed contacts, and the switch T2 has normally open contacts.

Because the switch T1 contacts are normally closed, the collet open signal passes through the switch T1 until the switch T1 times out. Thus, the "eject" pressure is supplied to the ejector actuator 36 through the valve 84 by way of the second air pressure regulator PR2 until the switch T1 times out. Preferably the switch T1 contacts remain closed for approximately 1 second, but this delay period may vary depending on the particular application with which the ejector 12 is used. When the switch T1 times out, the switch T1 contacts are opened and the valve 84 reverts to its original state so that the pressure applied to the ejector actuator 36 returns to the "sealing" pressure set by the first air pressure regulator PR1.

In normal operation of the ejector 12, the workpiece 20 is properly ejected before the switch T1 times out and the switch T1 contacts are opened. Thus, the contacts of the switch 76 are closed by the magnetic piston (not shown) before the contacts of the switch T1 open. With reference to FIG. 3, lathe operation is interrupted by the interrupt circuit 300 only if the contacts of each of the switch T1, the switch T2 and the sensing switch 76, which are connected in parallel, are open simultaneously. Although the switch T1 contacts open when the switch T1 times out, the contacts of the sensing switch 76 are normally closed at this time, and the lathe and ejector continue to operate. The switch T2 contacts are still open at this time because the switch T2 has not yet timed out. However, the switch T2 times out shortly, i.e. approximately 1 second, after the switch T1 times out, thus closing the switch T2 contacts. If a workpiece 20 was not properly ejected, the contacts of the sensing switch 76 would be open when the switch T1 times out, and no signal would pass through the interrupt circuit of FIG. 3 because the switch T1, the switch T2, and the sensing switch 76 would have simultaneously open contacts. Operation of the lathe 10 would then be interrupted, indicating a fault condition to the lathe operator.

If the contacts of the sensing switch 76 are closed indicating that the workpiece 20 was properly ejected, lathe operations continue, and another workpiece 20 is inserted into the collet mechanism 18. As a new workpiece 20 is inserted into the collet mechanism 18, the piston 46 and the piston rod 46A of the ejector actuator 36 are pushed inwardly and the contacts of the sensing switch 76 are opened as the magnetic piston 46 moves away from the sensing switch 76. Although both the switch T1 contacts and the contacts of the switch 76 are open at this time, lathe operations are not interrupted because the switch T2 has timed out and the switch T2 contacts are closed.

After the workpiece is fully loaded into the collet mechanism 18, the "collet open" signal is no longer sent by the controller 81. Accordingly, the collet mechanism 18 is closed, and the switch T1 and the switch T2 return to their normal states. At this point, the ejector 12 is normally ready to begin another ejection cycle following the machining of the new workpiece 20. However, when the "collet open" signal is removed, a "race" condition may arise whereby the switch T2 returns, i.e. races, to its normally open condition before the switch T1 returns to its normally closed condition. Because the piston 46 and piston rod 46A of the ejector actuator 36 are retracted at this time, lathe operation would be unnecessarily interrupted by the simultaneous open condition of each of the switch T1, the switch T2 and the sensing switch 76. To prevent this "race" condition, a capacitor C1 is placed in parallel with the switch T2 to power the switch T2 for a short time after the "collet open" signal is removed. Thus, it is assured that the switch T1 will return to its normally closed condition before the switch T2 returns to its normally open condition, and operation of the lathe will not be unnecessarily interrupted. A diode D1 is provided ahead of the switch T2 so that current from the capacitor C1 does not flow to the switch T1.

Although the presently preferred embodiments of this invention have been described, it will be understood that within the purview of the invention various changes may be made within the scope of the following claims.

Having thus described our invention, we claim:

1. A workpiece ejector for a lathe, said lathe comprising a rotatable spindle and a collet mechanism drivingly connected to the spindle for releasably holding a workpiece, said ejector comprising:

an air actuator located within the spindle and mounted for rotation therewith, said actuator having a piston which drives a rod connected thereto;

an ejector nosepiece drivingly connected to said rod and engageable with a workpiece held by said collet mechanism, said nosepiece being movable by said air actuator to eject said workpiece from said collet mechanism;

an air supply conduit extending within the spindle connecting said actuator to a source of air under pressure, said air supply conduit also rotating with said spindle;

a rotating union connecting said air supply conduit to said air source;

a sensing switch located adjacent said actuator, said switch being closed by said actuator when said piston, and thereby said rod, are moved to a predetermined position relative to said sensing switch, said sensing switch also rotating with said spindle; and means for providing an electrical path from a lathe controller through said sensing switch, comprising:

a slip ring assembly attached to and rotating with said spindle;

a cable extending within the spindle between said slip ring assembly and said sensing switch; and a fixed brush assembly in electrical contact with said slip ring assembly and further electrically connected to said lathe controller.

2. The ejector of claim 1 wherein said piston is magnetic, and wherein said sensing switch is a magnetic reed switch.

3. The ejector of claim 2 wherein said actuator is single-acting and includes a return spring biasing said piston toward its retracted position.

4. The ejector of claim 1 wherein said ejector nosepiece is detachable from said rod.

5. The ejector of claim 4 wherein said ejector nosepiece is threaded onto said rod.

6. The ejector of claim 1 further comprising a valve intermediate said air supply conduit and said air supply, said valve supplying air, on demand, at an eject pressure set by a pressure regulator to extend said piston, thereby ejecting a workpiece from said collet mechanism.

7. The ejector of claim 1 further comprising an air pressure regulating mechanism intermediate said air source and said air supply conduit, said air pressure regulating mechanism supplying air to said air actuator at a first pressure when machining operations are being performed on a workpiece gripped by said collet mechanism and, during at least certain times after machining operations have been performed on said workpiece, supplying air to said air actuator at a second pressure to eject the workpiece from the collet mechanism.

8. A workpiece ejector for a lathe having a rotatable spindle, said workpiece ejector comprising:

an ejector actuator mounted entirely within said spindle, said ejector actuator having an ejection member driven thereby and engageable with a workpiece held by said lathe, said ejection member being movable on demand to eject said workpiece from said lathe, said ejector actuator rotating with said spindle and comprising an air cylinder having a piston which drives a rod connected thereto, said ejection member comprising said rod;

a sensing switch located adjacent said ejector actuator, said sensing switch being closed by said ejector actuator when said piston, and thereby said rod, are extended to a predetermined position relative to said sensing switch, said sensing switch also rotating with said spindle; and means for providing an electrical path from a fixed lathe controller through said sensing switch, comprising:

a slip ring assembly attached to and rotating with said spindle;

a cable extending within the spindle between said slip ring assembly and said sensing switch; and a fixed brush assembly in electrical contact with said slip ring assembly and further electrically connected to said lathe controller.

9. The workpiece ejector of claim 8 further comprising a valve for supplying air to said air cylinder from an air source, on demand, at predetermined pressure set by a pressure regulator to eject a workpiece from said lathe.

10. The workpiece ejector of claim 9 further comprising a control circuit, comprising:

a first, normally-closed timed switch that opens after a first delay period, said first timed switch controlling the time during which said predetermined pressure is supplied to said air cylinder by said valve, and said sensing switch;

said control circuit interrupting operation of said lathe if said first timed switch and said sensing switch are simultaneously open.

11. The workpiece ejector of claim 10 wherein said control circuit further comprises a second, normally-open timed switch that closes after a second delay period, said second delay period being longer than said first delay period, and wherein said control circuit interrupts operation of said lathe if said first timed switch, said second timed switch, and said sensing switch are simultaneously open.

12. A workpiece ejector for a lathe, said lathe comprising a rotatable spindle and a collet mechanism drivingly connected to the spindle for releasably holding a workpiece, said ejector comprising:

an air actuator located within the spindle and mounted for rotation therewith, said actuator having a piston which drives a rod connected thereto;

an ejector nosepiece drivingly connected to said rod and moveable into engagement with a workpiece held by said collet mechanism;

an air supply conduit extending within the spindle connecting said actuator to a source of air under pressure, said air supply conduit also rotating with said spindle;

a rotating union connecting said air supply conduit to said air source;

a sensing switch located adjacent said actuator, said switch being closed by said actuator when said piston, and thereby said rod, are moved to a predetermined position relative to said sensing switch, said sensing switch also rotating with said spindle; and means for providing an electrical path from a lathe controller through said sensing switch, comprising:
a slip ring assembly attached to and rotating with said spindle;
a cable extending within the spindle between said slip ring assembly and said sensing switch; and
a fixed brush assembly in electrical contact with said slip ring assembly and further electrically connected to said lathe controller.

13. The ejector of claim 12 wherein said piston is magnetic, and wherein said sensing switch is a magnetic reed switch.

14. The ejector of claim 13 wherein said actuator is single-acting and includes a return spring biasing said piston toward its retracted position.

15. The ejector of claim 12 wherein said ejector nosepiece is detachable from said rod.

16. The ejector of claim 15 wherein said ejector nosepiece is threaded onto said rod.

17. The ejector of claim 12 further comprising a valve intermediate said air supply conduit and said air supply, said valve supplying air, on demand, at an eject pressure set by a pressure regulator to extend said piston, thereby ejecting a workpiece from said collet mechanism.

18. The ejector of claim 12 further comprising an air pressure regulating mechanism intermediate said air source and said air supply conduit, said air pressure regulating mechanism supplying air to said air actuator at a first pressure when machining operations are being performed on a workpiece gripped by said collet mechanism and, during at least certain times after machining operations have been performed on said workpiece, supplying air to said air actuator at a second pressure to eject the workpiece from the collet mechanism.

19. A workpiece ejector for a lathe having a rotatable spindle, comprising:

an ejector actuator mounted within said spindle, said ejector actuator having an ejection member driven thereby and movable to eject a workpiece held by said lathe, said ejector actuator rotating with said spindle and comprising an air cylinder having a piston which drives a rod connected thereto, said ejection member comprising said rod;

a sensing switch located adjacent said ejector actuator, said sensing switch being closed by said ejector actuator when said piston, and thereby said rod, are extended to a predetermined position relative to said sensing switch, said sensing switch also rotating with said spindle; and means for providing an electrical path from a fixed lathe controller through said sensing switch, comprising:
a slip ring assembly attached to and rotating with said spindle;
a cable extending within the spindle between said slip ring assembly and said sensing switch; and
a fixed brush assembly in electrical contact with said slip ring assembly and further electrically connected to said lathe controller.

20. The workpiece ejector of claim 19 further comprising a valve for supplying air to said air cylinder from an air source, on demand, at predetermined pressure set by a pressure regulator to eject a workpiece from said lathe.

21. The workpiece ejector of claim 20 further comprising a control circuit, comprising:

a first, normally-closed timed switch that opens after a first delay period, said first timed switch controlling the time during which said predetermined pressure is supplied to said air cylinder by said air pressure regulator, and said sensing switch;

said control circuit interrupting operation of said lathe if said first timed switch and said sensing switch are simultaneously open.

22. The workpiece ejector of claim 21 wherein said control circuit further comprises a second, normally-open timed switch that closes after a second delay period, said second delay period being longer than said first delay period, and wherein said control circuit interrupts operation of said lathe if said first timed switch, said second timed switch, and said sensing switch are simultaneously open.

* * * * *